United States Patent
Shah et al.

[11] Patent Number: 6,137,747
[45] Date of Patent: Oct. 24, 2000

[54] SINGLE POINT CONTACT ACOUSTIC TRANSMITTER

[75] Inventors: Vimal V. Shah, Houston; James R. Birchak, Spring; John W. Minear; Wallace R. Gardner, both of Houston; Donald Kyle, Plano; John R. Dennis, Highland Village; Kenny McConnell, Lewisville; George S. Reagan, The Colony; Rebecca McConnell, Lewisville, all of Tex.

[73] Assignee: Halliburton Energy Services, Inc., Houston, Tex.

[21] Appl. No.: 09/087,220

[22] Filed: May 29, 1998

[51] Int. Cl.[7] ........................................................ H04H 9/00
[52] U.S. Cl. ............................ 367/81; 367/82; 340/856.4
[58] Field of Search .................... 367/81, 82; 340/855.1, 340/855.4, 855.6, 856.4

[56] References Cited

U.S. PATENT DOCUMENTS

| | | | |
|---|---|---|---|
| 4,293,936 | 10/1981 | Cox et al. | 367/82 |
| 4,298,970 | 11/1981 | Shawhan et al. | 367/82 |
| 4,992,997 | 2/1991 | Bseisu | 367/82 |
| 5,128,901 | 7/1992 | Drumheller | 367/82 |
| 5,130,951 | 7/1992 | Kingman | 367/82 |
| 5,166,908 | 11/1992 | Montgomery | 367/165 |
| 5,214,252 | 5/1993 | Mari et al. | 181/104 |
| 5,222,049 | 6/1993 | Drumheller | 367/1 |
| 5,229,554 | 7/1993 | Cole | 181/106 |
| 5,245,734 | 9/1993 | Issartel | 29/25.35 |
| 5,250,868 | 10/1993 | Shirasu | 310/328 |
| 5,289,074 | 2/1994 | Mori | 310/328 |
| 5,289,354 | 2/1994 | Clayer et al. | 367/82 |
| 5,289,433 | 2/1994 | Cowles et al. | 367/34 |
| 5,295,288 | 3/1994 | Dam et al. | 29/25.35 |
| 5,301,170 | 4/1994 | James | 367/188 |
| 5,510,582 | 4/1996 | Birchak et al. | 181/102 |
| 5,644,186 | 7/1997 | Birchak et al. | 310/337 |
| 5,675,325 | 10/1997 | Taniguchi et al. | 340/854.4 |
| 5,703,836 | 12/1997 | Drumheller | 367/165 |

*Primary Examiner*—Michael Horabik
*Assistant Examiner*—Timothy Edwards, Jr.
*Attorney, Agent, or Firm*—Conley, Rose & Tayon, P.C.

[57] ABSTRACT

The invention is an acoustic transmitter that imparts vibratory stresses onto a signal propagation medium such as oil well tubing when actuated by an electric driver. In one embodiment, the acoustic transmitter utilizes a mechanical driver that includes piezoelectric elements to generate the vibratory stresses. The acoustic transmitter is mechanically attached at only one point to the signal propagation medium. This single point attachment eliminates loading on the acoustic transmitter from compressive and tensile forces carried by the signal propagation medium. A mass backing the mechanical driver may be used to extend the frequency range over which the acoustic transmitter is operable. In addition, the resonance response of the acoustic transmitter may be minimized by the use of a viscous dampener. The viscous dampener is configured to "couple" with the mechanical driver when the acoustic transmitter is operating and to "uncouple" with the mechanical driver at other times.

18 Claims, 3 Drawing Sheets

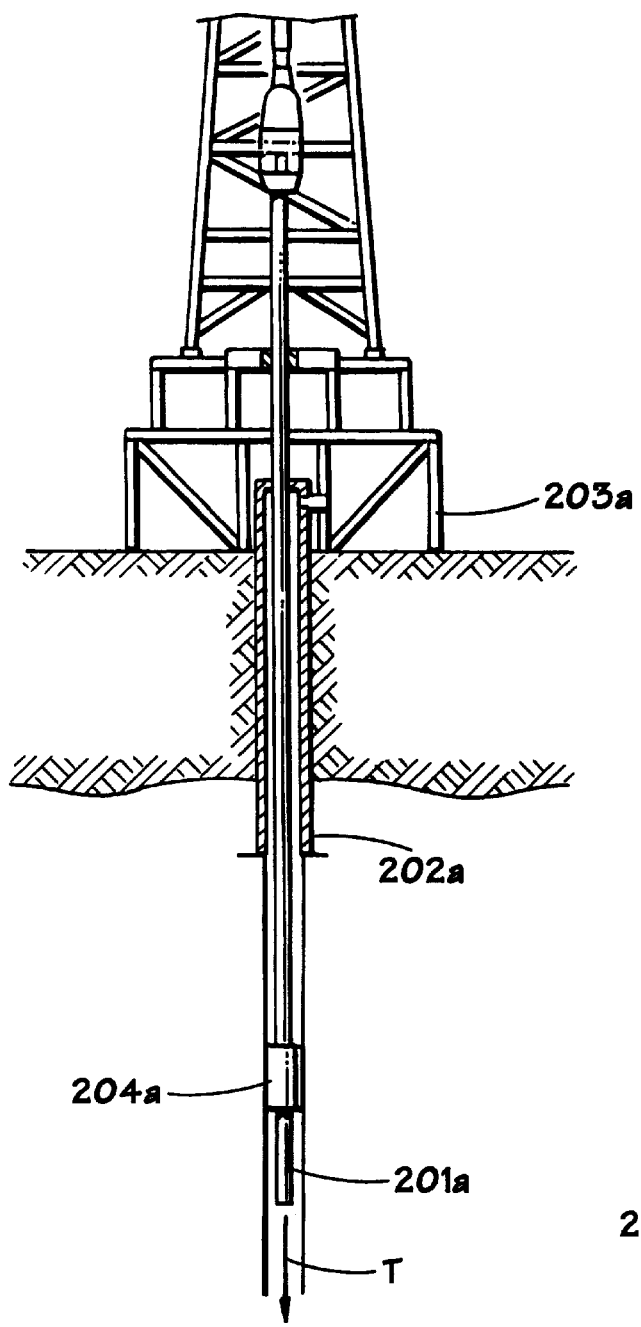
FIG. 2A
(PRIOR ART)
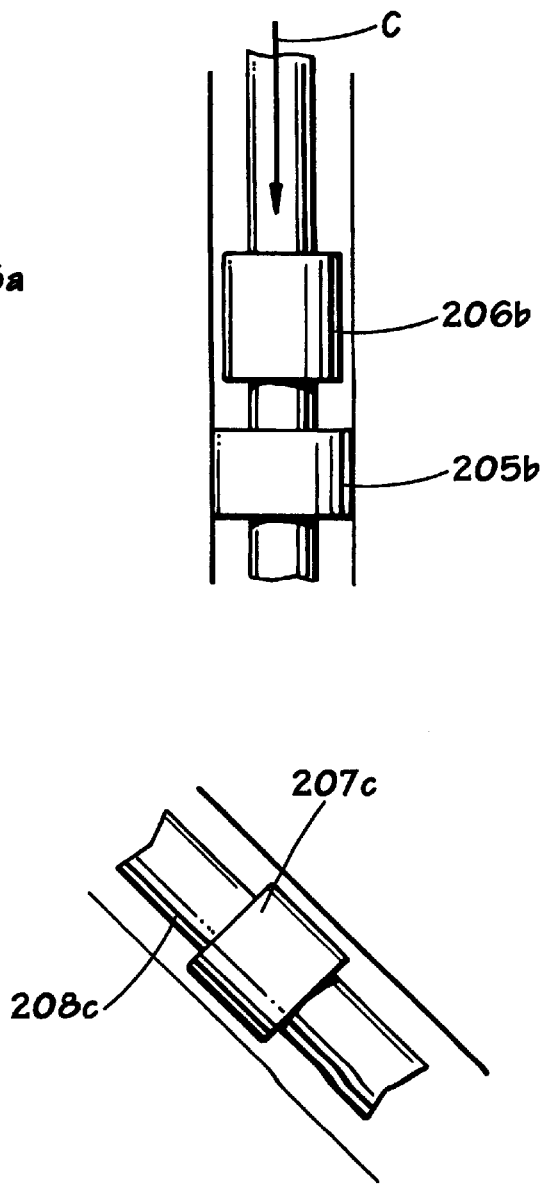
FIG. 2B
(PRIOR ART)
FIG. 2C
(PRIOR ART)

6,137,747

SINGLE POINT CONTACT ACOUSTIC TRANSMITTER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to devices that transmit acoustic or stress wave signals. More particularly, the present invention relates to devices that transmit acoustic or stress signals through an elastic media. Still more particularly, the present invention relates to acoustic transmitters that transmit acoustic or stress signals via well tubing.

2. Description of the Related Art

The recovery of subterranean hydrocarbons, such as oil and gas, usually requires drilling boreholes thousands of feet deep. In addition to an oil rig on the surface, production tubing extends downward through the borehole to hydrocarbon formation. The tubing may have horizontal, or lateral bores which incorporate valves to control the flow of hydrocarbons or other well fluids. To efficiently operate this complex production system, well site personnel often require reliable "real time" data regarding borehole conditions. For example, knowing downhole pressure and temperature is vital in determining whether production is proceeding within permissible operating parameters. With the prevalence of multi-lateral drilling, characterizing the well fluids, using data such as resistivity measurements, plays an important role in deciding which valves to actuate in order to maximize hydrocarbon recovery. Because accurate well bore data is essential to effective management of well site operations, reliable means is required to transmit accurate borehole environment information to the surface.

Several approaches have been employed with limited success to transmit downhole telemetry data to the surface. Linking downhole instrumentation to the surface with wiring has proven exceedingly expensive and unreliable due to the corrosive fluids and high ambient temperatures often found in the well. Electromagnetic radiation has been utilized as a transmission media. However, the non-uniformity in conductivity has prevented wide spread use of this approach. More common is the practice of transmitting data using pressure waves in drilling fluids such as drilling mud, or mud pulse/mud siren telemetry. However, the low baud rate normally produced by mud pulse telemetry transmitters limits the ability of well site personnel to analyze and respond to well conditions. Further, this approach is not available for production tubing because no drilling fluids are present.

Telemetry utilizing acoustic transmitters in the pipe string, such as a mandrel or production tubing, has emerged as a potential method to increase the speed and reliability of data transmission from downhole to the surface. When actuated by a signal such as a voltage potential from a sensor, an acoustic transmitter mechanically mounted on the tubing imparts a stress wave or acoustic pulse onto the tubing string. Because metal pipe propagates stress waves more effectively than drilling fluids, acoustic transmitters used in this configuration have been shown to transmit data in excess of 10 BPS (bits per second). Furthermore, such acoustic transmitters can be used during all aspects of well site development regardless of whether drilling fluids are present.

Despite the promise of acoustic transmitters as an approach to increase data transmission rates, tubing string within the borehole often develops mechanical stresses that can render prior art acoustic transmitters inoperative. Referring to FIG. 1, a prior art transmitter 101 is disposed downhole. Prior art transmitter 101 includes a piezoelectric stack 102 having a plurality of elements and a member 103 having a first end 104 and a second end 105. The first end 104 and second end 105 of the member 103 are solidly connected to production tubing 106. Member 103 has an annular recess 107 that captures the piezoelectric stack 102. A substantially axial interference fit exists between the piezoelectric stack 102 and the recess 107 in order to induce an axial loading that tends to compress the elements of the piezoelectric stack 102 together; i.e., the piezoelectric stack 102 is under a compressive loading as indicated by arrows 108.

As a voltage differential is applied to the piezoelectric stack 102, the elements of the piezoelectric stack 102 expand axially in the recess 107. The piezoelectric stack then contracts when the voltage across it returns to zero. As long as the piezoelectric stack 102 is compressed within the recess 107, piezoelectric stack 102 expansion will axially displace the first end 104 of the member 103 with respect to the second end 105 of the member 103 and thereby induce a controlled stress onto the tubing 106. This controlled stress generates waves in the tubing that are propagated to the surface. As such, by applying voltage differentials to piezoelectric stack 102 in a controlled manner, waveforms are generated that transmit data to the surface.

For the acoustic transmitter to function properly, the recess 107 must maintain the compressive loading 108 of the piezoelectric stack 4 within a limited range. If stresses in the tubing 106 push the first end 104 and second end 105 of the member 103 toward one another, the resulting compressive loading may be too severe and result in a "locking up" of the piezoelectric stack 102 by preventing the piezoelectric stack 102 from expanding as voltage is applied. On the other hand, if stresses in the tubing 106 pull ends 104, 105 apart, tensile loading 109 results. This tensile loading 109 reduces the compressive loading 108 of the piezoelectric stack 102. When tensile loading 109 is sufficiently high, the elements of the piezoelectric stack 102 separate and are no longer able to generate stress signals on tubing 106.

Unfortunately, compressive and tensile loading are often encountered during normal hydrocarbon drilling and production. Referring to FIG. 2A, a tubing 201a having an acoustic transmitter 204a is suspended within a borehole 202a from a rig 203a. Where tubing 201a extends for several thousand feet, a prior art transmitter 204a interposed in that span can be subjected to significant tensile loading, T. Referring now to FIG. 2B, if a packer 205b were released in the middle of such a long expanse of tubing, a prior art transmitter 206b located above the packer 205b may encounter compressive loading, C. Moreover, as shown in FIG. 2C, wells that have deviated tubing 207c present unique problems because it is impossible to predict which sections of tubing 207c will be subjected to compressive loading and which sections of tubing 207c will be subjected to tensile loading. Therefore, even under normal operating conditions, prior art transmitters can suffer from complete signal loss because of piezoelectric stack "lock up" or separation.

Additionally, when prior art acoustic transmitters are operated at well sites, undesirable multiple resonances are often displayed during band sweeps. That is, transmissions over particular frequencies generate amplitude spikes that complicate the monitoring of well bore data. Moreover, the locations of the resonance frequencies vary with the unique configuration of each well site.

These and other problems have prevented the oil and gas industry from utilizing fully acoustic transmitters. As such, there exists a need for an improved acoustic transmitter. The present invention overcomes the deficiencies of the prior art.

SUMMARY OF THE INVENTION

The present invention includes a single mechanical connection to the tubing. Threaded into the tubing is a top nut. Connected to the top nut is a support sleeve around which a piezoelectric stack is held. Capturing and compressing the piezoelectric stack is an assembly consisting of a load ring, tungsten mass and viscous damper.

The present invention comprises a combination of features and advantages which enable it to overcome the various problems of the prior art. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein:

FIG. 2A is a cross-sectional elevation view of a typical well site.

FIG. 2B is a cross-sectional view of a prior art transmitter disposed above a packer on a tubing string.

FIG. 2C is a cross-sectional view of a prior art transmitter disposed in a deviated borehole.

DESCRIPTION OF THE PREFERRED EMBODIMENT

Figure 1:
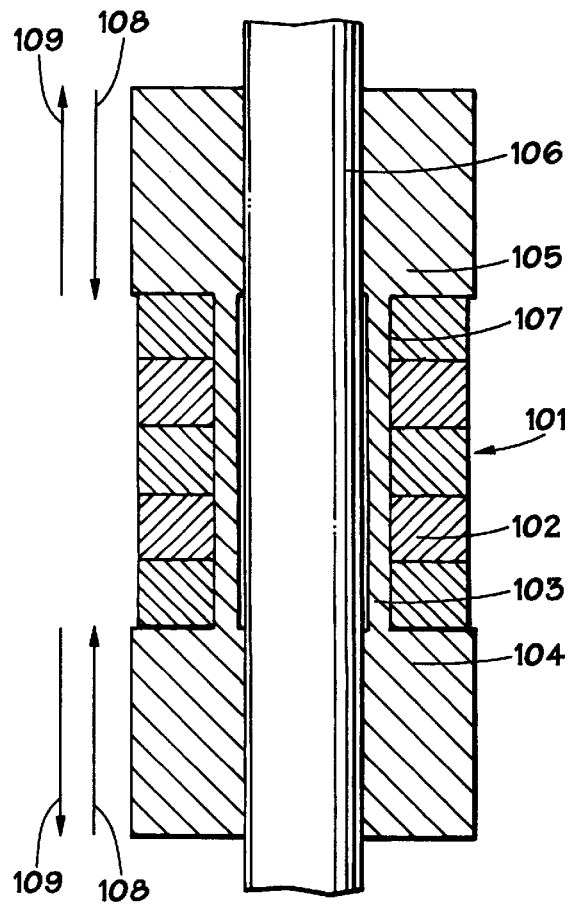
FIG. 1 is a cross-sectional view of a prior art acoustic transmitter.
Figure 3:
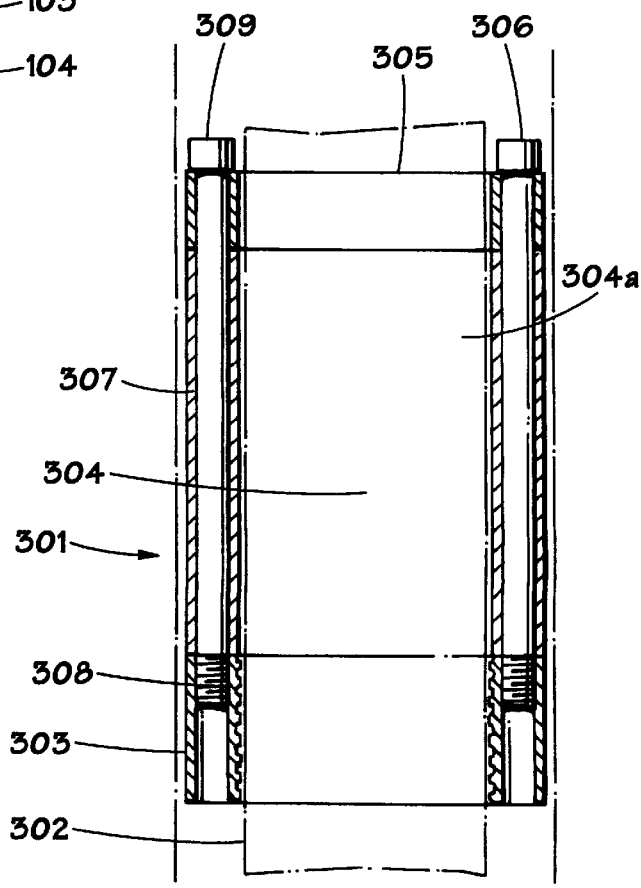
FIG. 3 is a cross-sectional view of the acoustic transmitter of the present invention.

Referring now to FIG. 3, there is shown the acoustic transmitter 301 mounted onto a tubing 302 at a single point or end. In lieu of tubing, drill pipe or other appropriate tubular member may be used. The acoustic transmitter 301 includes a lower jam nut 303, a piezoelectric stack or mechanical driver 304 having a plurality of elements 304a, a load washer 305, and a plurality of connectors such as bolts 306. The piezoelectric stack 304 has axial clearance holes 307. Bolts 306 extend through the clearance holes 307 and couple with mating threads 308 on the lower jam nut 303. This coupling provides a desired compressive force to piezoelectric stack 304. Lower jam nut 303 is mechanically secured to the tubing 302. Because the piezoelectric stack 304 can fracture when subjected to concentrated forces, the load washer 305 is interposed between the heads 309 of bolts 306 and piezoelectric stack 304 to distribute the compressive forces evenly over the elements making up piezoelectric stack 304.

Referring still to FIG. 3, the acoustic transmitter 301 connects to tubing 302 only at the lower jam nut 303, i.e. at a single point. By avoiding two points of contact on opposing sides of the piezoelectric stack 304, compressive or tensile loading on the tubing 302 cannot push together or pull apart the piezoelectric stack 304. Consequently, the compressive and tensile forces that may develop in the tubing 302 cannot be transferred to the piezoelectric stack 304. As such, the desired compressive force imparted by bolts 306 and load washer 305 remains relatively constant and keeps piezoelectric stack 304 in an operable range. Thus, prior difficulties with stack separation or stack "lock up" are eliminated.

Alternatives to using a piezoelectric stack 304 as a driver to generate acoustic signals include magneto-strictive devices such as Terfenol. Terfenol, as the driving mechanism, imparts a controlled stress to the tubing. It may also, in certain situations, provide a larger amplitude signal. Thus, the mechanical driver can be selected to optimize the response of the acoustic transmitter. As used herein, the term "driver" includes elements capable of imparting a vibratory stress onto a propagation medium.

The acoustic transmitter 301 of FIG. 3 is expected to provide satisfactory high frequency signals above about 1800 Hz for transmission upstream of the borehole. However, well applications often require lower frequency signals to be transmitted upstream. For example, the interfaces or connections between sections of tubing may block high frequency signals, but allow low frequency signals to pass. Therefore, the acoustic transmitter 301 of the present invention is advantageous in that it can generate a low frequency signal which is preferred. The preferred acoustic transmitter 301 of the present invention improves performance so that the acoustic transmitter 301 may provide satisfactory signals at frequencies below 1800 hz.

Figure 4:
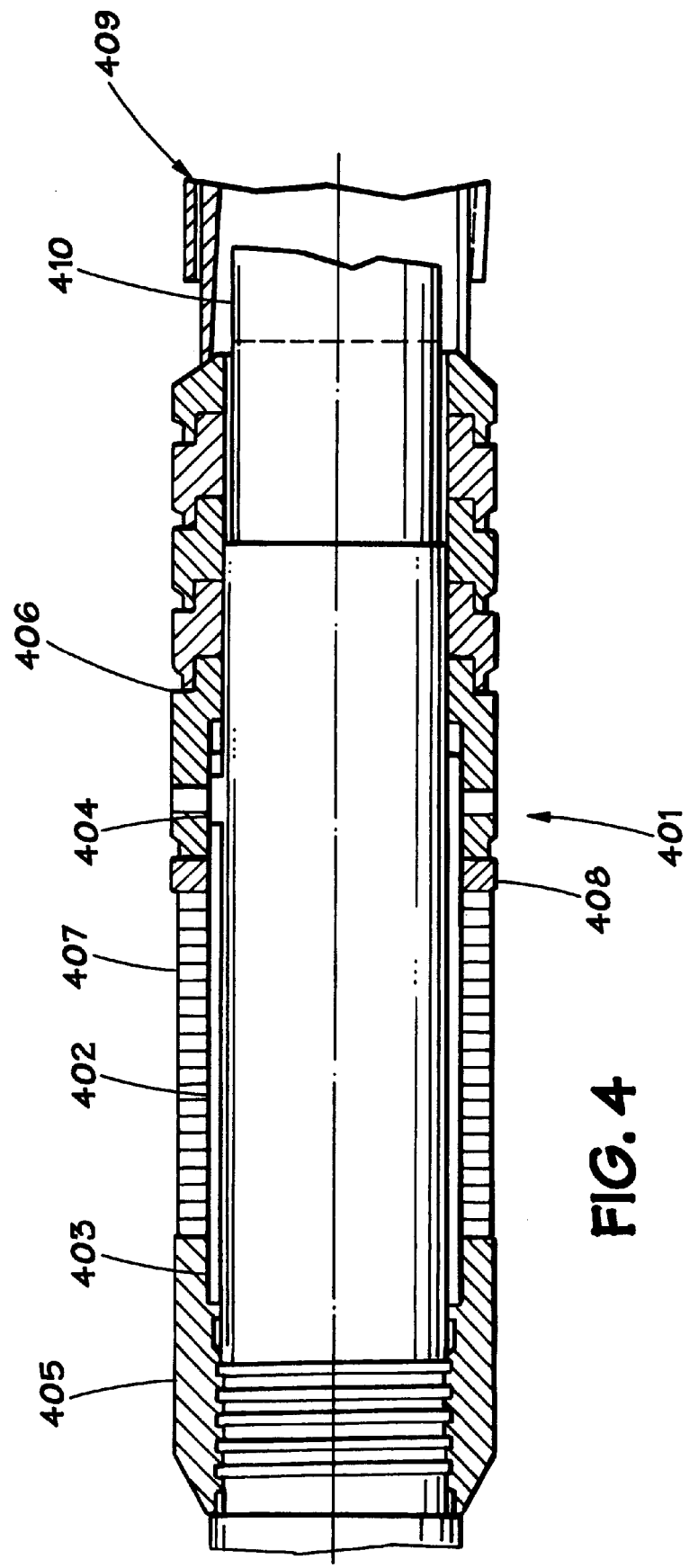
FIG. 4 is a cross-sectional view of another embodiment of the acoustic transmitter of the present invention.

Referring now to FIG. 4, there is shown an alternative embodiment of the preferred acoustic transmitter. Acoustic transmitter 401 includes a housing (not shown), a support sleeve 402 having a mounting end 403 and a free end 404, a top nut 405, a backing mass 406 having internal threads, a piezoelectric stack 407 having a plurality of elements, a load ring 408 between backing mass 406 and piezoelectric stack 407, and a viscous dampener 409. Also shown is tubing 410.

Top nut 405 establishes a fixed mechanical connection to the tubing 410. This mechanical connection may be mating threads, as shown, or some other appropriate attachment. Mounting end 403 of the support sleeve 402 rigidly affixes to top nut 405. The preferred acoustic transmitter 401 uses a suitable glue as the affixing method, but any suitable affixing mechanism may be employed. Piezoelectric stack 407 surrounds the support sleeve 402 and abuts against the top nut 405 and load ring 408. The free end 404 of support sleeve 402 has threads that mate with the internal threads of the backing mass 406. The backing mass 406 couples with the free end 404 of the support sleeve 402 and thereby captures the piezoelectric stack 407. The load ring 408 interposed between the backing mass 406 and the piezoelectric stack 407.

Still referring to FIG. 4, the preferred acoustic transmitter 401 clamps the piezoelectric stack 407 between the top nut 405 and the backing mass 406. As the backing mass 406 is threaded onto the support sleeve 402, the backing mass 406 travels axially toward the top nut 405. Incremental axial movement of backing mass 405 will gradually clamp the load ring 408 and piezoelectric stack 407 against the top nut

405. When the backing mass has traveled a sufficient distance to induce proper compressive loading in the piezoelectric stack 407, set screws (not shown) lock the backing mass 406 in place. A compressive stress of 2500–7000 psi (pounds per square inch) applied to the piezoelectric stack 407 appears to generate suitable signals in well bore applications. If a mechanical driver other than piezoelectric elements 406 is used, the configuration of the preferred acoustic transmitter 401 should be revised accordingly. As used herein, the term "clamp" includes any appropriate structure that captures the piezoelectric stack 407 and applies to it a desired compressive loading.

During operation, the preferred acoustic transmitter 401 receives input from an electric driver or sensor (not shown). The piezoelectric stack 407 reacts to the input, such as a voltage differential, by expanding. Because the piezoelectric stack 407 is compressed against a dense and relatively immovable Tungsten mass 406, the piezoelectric stack 407 expansion is transferred as a compressive stress to the tubing 410 via the top nut 405. Thus, as an electric driver provides an excitation signal, the acoustic transmitter 401 "fires" and sends an acoustic pulse through the tubing 410 to the surface.

Backing mass 406, located at the free end of piezoelectric stack 407, improves operation of the preferred acoustic transmitter at lower frequencies. Backing mass 406 acts as an inertial element against which the piezoelectric stack 407 can react or "push." This additional mass allows the piezoelectric stack to vibrate at lower frequencies. Tungsten is preferable as the backing mass 406 material because its high mass density allows a compact configuration. If space considerations are not relevant, lower density materials can alternately be employed. Indeed, a piezoelectric stack 407 of sufficient mass could provide an inherent and sufficient backing mass.

A related beneficial aspect of the backing mass 406 is that the weight of the backing mass 406 has a predicable effect on the operating frequency of the preferred acoustic transmitter 401. Thus, well site personnel can "fine tune" the response characteristics of the preferred acoustic transmitter 401 by varying the weight of the backing mass 406.

Acoustic transmitter 401 uses a support sleeve 402 for two reasons. First, as shown in FIG. 3, it is expected that the bolt clearance holes 307 in the piezoelectric stack 304 will cause the acoustic transmitter 301 to occasionally generate nonsymmetrical stress waves. Second, clearance holes 307 weaken the structural integrity of the piezoelectric stack 304. Referring back to FIG. 4, these problems are largely alleviated by using a support sleeve 402 that requires only one concentric clearance hole in the piezoelectric stack 407. A Teflon coating (not shown) is applied to the support sleeve 402 surfaces that contact the piezoelectric stack 407 to preserve free axial movement of the piezoelectric stack 407 along the support sleeve 402.

Referring now to FIG. 4, the preferred transmitter 401 uses Invar as the support sleeve 402 material. Invar has a very low coefficient of thermal expansion, similar to the coefficient of thermal expansion for the piezoelectric stack 407. Consequently, the piezoelectric stack 407 and support sleeve 402 will expand at the same rate as borehole temperatures increase. Therefore, the possibility that the piezoelectric stack 407 may lose compression and cause the elements of the piezoelectric stack 407 to separate at elevated ambient temperatures in the borehole is minimized. If Invar is not used as the material, a set of springs (not shown) can be installed between the piezoelectric stack 407 and load ring 408 to take up the slack caused by the thermal expansion of the support sleeve 402.

Viscous dampener 409 is solidly mounted to the tubing 410 and variably coupled to the backing mass 406. The inclusion of viscous dampener 409 is not necessary for adequate operation of the preferred acoustic transmitter. However, viscous dampener 409 minimizes the resonance responses of preferred acoustic transmitter 401 without transferring compressive or tensile stresses to the piezoelectric stack 407. As discussed earlier, transmissions through piping often are complicated by occurrences of resonance frequencies. As such, a viscous dampener as taught in U.S. Pat. No. 5,510,582, the teachings of which are here incorporated by reference, is preferably used as part of this preferred acoustic transmitter. During the fast movement or oscillations associated with acoustic wave or pulse transmissions, a properly adjusted viscous dampener 409 "solidly" couples the piezoelectric stack 407 and backing mass 406 to the tubing 410. This solid coupling inhibits the sharp "spikes" in amplitude.

However, when the tubing 410 encounters tensile and compressive loadings under normal operating conditions, these loadings occur through slow movement of the tubing 410. A properly adjusted viscous dampener 409 "uncouples" with the piezoelectric stack 407 from the tubing 410 under such conditions and does not transfer the tensile or compressive loading to the piezoelectric stack 407.

Multiple acoustic transmitters can be arrayed along the tubing string to reinforce signal transmission. In order to prevent interference, the electrical timing of all acoustic transmitters employed must be coordinated to ensure sequential firing.

The term "piezoelectric stack" or "piezoelectric elements" is used throughout to identify an element or combination of elements that exhibit the "piezoelectric effect."

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. An apparatus to transmit acoustic signals through a signal propagation medium having an exterior surface, comprising:

a driver disposed outside the signal propagation medium, said driver being capable of expansion and contraction; and a clamp associated with said driver and having a first portion and a second portion, said first portion of said clamp being connected to the exterior surface of the signal propagation medium so as to transfer vibratory stresses induced by the expansion and contraction of said driver to the signal propagation medium, said second portion of said clamp being free from connection with said signal propagation medium, and wherein said first portion and said second portion cooperate to provide a compressive force to said driver.

2. The apparatus of claim 1, further comprising a viscous dampener variably coupling said clamp second portion to the signal propagation medium, said viscous dampener coupling with said clamp when said driver generates said vibratory stresses and uncoupling with said clamp when said driver does not generate said vibratory stresses.

3. The apparatus of claim 1, wherein said clamp further comprises a mass portion, said mass portion associated with said driver and providing said driver with an inertial mass against which to expand and contract; and further comprising a sleeve retaining said driver, said sleeve being formed of material that has a coefficient of thermal expansion similar to that of said driver.

4. The apparatus of claim 3, wherein said clamp second portion includes a free end to which said mass portion attaches; and further comprising a friction reducing lining interposed between said driver and said sleeve.

5. The apparatus of claim 3, wherein said clamp second portion includes a free end on which said mass attaches; and further comprising a friction reducing lining interposed between said mass and said sleeve.

6. The apparatus of claim 3 wherein said driver includes a concentric bore for receiving said sleeve.

7. A method of transmitting acoustic signals in a signal propagation medium having an exterior surface, comprising the steps of:
   (a) providing a driver having a first end and a free end;
   (b) connecting the driver first end to the exterior surface of the signal propagation medium to form a single acoustical connection between the driver and the signal propagation medium; and
   (c) activating the driver.

8. The method of claim 7, further comprising retaining the driver with a sleeve; interposing a friction reducing lining between the driver and said sleeve; and attaching an inertial mass portion to the driver.

9. The method of claim 7 further comprising coupling said driver to the signal propagation medium exterior surface using a viscous dampener.

10. An apparatus for transmitting acoustic signals through a signal propagation medium formed of tubing, comprising:
   a driver for imparting vibratory stresses into the signal propagation medium, said driver being connected to the outside of the tubing;
   a mass portion attached to the driver; and
   a means for engaging the signal propagation medium at two points when the driver is actuated and disengaging from the signal propagation medium at one of the two points when the driver is not actuated.

11. An apparatus for transmitting acoustic signals through a tubular member having an exterior surface comprising:
   a clamp having a first end connected to the tubular member exterior surface, said clamp being cantilevered from the tubular member; and
   a driver housed within said clamp and juxtaposed to said first end of clamp, said driver capable of expansion and contraction, said expansion and contraction imparting vibratory stresses through said first end of clamp onto the tubular member, whereby said clamp provides a compressive force to said driver.

12. The apparatus of claim 11 further comprising a dampener variably coupling said clamp to the signal propagation medium, said dampener having a fixed state wherein said clamp is substantially fixed to the signal propagation medium and an uncoupled state wherein said clamp is substantially uncoupled with the signal propagation medium.

13. The apparatus of claim 11 further comprising an internal sleeve retaining said driver.

14. The apparatus of claim 13 wherein said sleeve and said driver have a similar coefficient of thermal expansion.

15. The apparatus of claim 14, wherein said clamp includes a second end, and further comprising a viscous dampener variably coupling said clamp second end to the tubular member, said viscous dampener coupling with said clamp when said driver generates said vibratory stresses and uncoupling with said clamp when said driver does not generate said vibratory stresses.

16. A system for transmitting signals through a tubular string disposed in a well bore, comprising:
   first and second transmitters disposed along the tubular string, each of said transmitters including a clamp providing a first connection to the tubular;
   a driver compressed within each of said clamps;
   a backing mass associated with each driver;
   a dampener connecting each clamp to the tubular string, said dampener providing a variable second connection between said clamp and the tubular string, said variable second connection of said dampener having a fixed state wherein said clamp is substantially fixed to the tubular string and an uncoupled state wherein said clamp is substantially uncoupled from the tubular string; wherein said first transmitter is configured to generate a first signal, and said second transmitter is configured to generate a second signal in response to said first signal.

17. A telemetry system, comprising:
   a tubular string having an exterior surface;
   first and second transmitters disposed along said tubular string, each of said transmitters including a clamp providing a first connection onto said exterior surface of said tubular string; a driver compressed within said clamp; a backing mass associated with said driver; and wherein said first transmitter is configured to generate a first signal, and said second transmitter is configured to generate a second signal in response to said first signal generated by said first transmitter.

18. An apparatus for transmitting acoustic signals through a signal propagation medium, comprising:
   a clamp having a first end connected to the signal propagation medium, said clamp being cantilevered from the signal propagation medium;
   a driver compressed within said clamp, said driver expanding and contracting in response to an excitation signal, said expansion and contraction imparting vibratory stresses through said first clamp end onto said signal propagation medium; and
   a dampener variably coupling said clamp to the signal propagation medium, said dampener having a fixed state wherein said clamp is substantially fixed to the signal propagation medium and an uncoupled state wherein said clamp is substantially uncoupled with the signal propagation medium.

* * * * *